US008255013B1

(12) United States Patent
Babella et al.

(10) Patent No.: US 8,255,013 B1
(45) Date of Patent: Aug. 28, 2012

(54) AUDIO RECEIVER DESIGN FOR A MOBILE COMPUTING DEVICE

(75) Inventors: Mark Babella, San Jose, CA (US); Stephen Senatore, So. San Francisco, CA (US); Weiping Dou, San Jose, CA (US); Avi Kopelman, Sunnyvale, CA (US); William Noellert, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1030 days.

(21) Appl. No.: 11/612,336

(22) Filed: Dec. 18, 2006

(51) Int. Cl.
*H04B 1/38* (2006.01)

(52) U.S. Cl. .................. 455/575.1; 455/130; 455/575.9; 455/575.7; 455/347

(58) Field of Classification Search ............... 455/575.1, 455/39, 66.1, 556.1, 130, 575.9, 90.3, 562.1, 455/575.5, 575.7, 1, 68.1, 347
See application file for complete search history.

(56) References Cited

U.S. PATENT DOCUMENTS

| | | | |
|---|---|---|---|
| 5,025,666 A * | 6/1991 | Kobayashi et al. ............. 73/632 |
| 6,128,385 A * | 10/2000 | Goyal et al. ............. 379/433.01 |
| 6,180,895 B1 * | 1/2001 | Hutchinson et al. .......... 200/5 A |
| 6,463,263 B1 * | 10/2002 | Feilner et al. ................. 455/90.1 |
| 6,892,051 B2 * | 5/2005 | Schmitt et al. ................ 455/41.2 |
| 7,142,935 B2 * | 11/2006 | Janik .............................. 700/94 |
| 7,289,627 B2 * | 10/2007 | Satoh et al. .............. 379/433.13 |
| 2002/0196953 A1 * | 12/2002 | Burke ............................ 381/309 |
| 2004/0264887 A1 * | 12/2004 | Rosenberg et al. ............. 385/92 |
| 2005/0059444 A1 * | 3/2005 | Martinez et al. ........... 455/575.7 |
| 2006/0094378 A1 * | 5/2006 | Murray et al. ................ 455/128 |
| 2006/0199554 A1 * | 9/2006 | Kwon et al. .................. 455/142 |
| 2008/0001828 A1 * | 1/2008 | Black et al. ................... 343/702 |
| 2008/0002024 A1 * | 1/2008 | Schweers ........................ 348/61 |

FOREIGN PATENT DOCUMENTS

WO          WO03078854 A1 *   9/2003

\* cited by examiner

*Primary Examiner* — Tuan Pham

(57) ABSTRACT

Various embodiments of an audio receiver design for a mobile computing device are described. The mobile computing device may comprise an audio receiver structured and arranged to port to the rear of the mobile computing device. In some embodiments, the mobile computing device may be implemented as a dual-mode Global System for Mobile Communications/Universal Mobile Telephone System (GSM/UMTS) quad-band device. The mobile computing device also may comprise a Global Positioning System (GPS) antenna for providing positioning determination capabilities and location-based services. In various implementations, the audio receiver may be ported to an in-vehicle system, such as an onboard entertainment system, navigation system, and/or communications system. Other embodiments are described and claimed.

22 Claims, 3 Drawing Sheets

AUDIO RECEIVER DESIGN FOR A MOBILE COMPUTING DEVICE

RELATED APPLICATIONS

This application is related to co-pending U.S. patent application Ser. No. 11/612,293, titled Internal Quad-Band Architecture for a Mobile Computing device, which is being filed concurrently herewith and is incorporated by reference.

BACKGROUND

A mobile computing device such as a combination handheld computer and mobile telephone or smart phone generally may provide voice and data communications functionality, as well as computing and processing capabilities. For voice and data communications, the mobile computing device typically employs a radio transmitter/receiver ("transceiver") and one or more antennas. Antenna design for a mobile computing device is an important consideration and is often limited by strict performance constraints.

Some antenna placements may restrict where other components, such as an audio receiver, may be located within the mobile computing device resulting in an overall increase in the size and shape of the device. Such design considerations are extremely important and problematic for mobile computing devices with smaller form factors. Accordingly, there exists the need for an improved audio receiver design for a mobile computing device.

DETAILED DESCRIPTION

Various embodiments are directed to an audio receiver design for a mobile computing device. The mobile computing device may comprise an audio receiver structured and arranged to port to the rear of the mobile computing device. In one or more embodiments, the mobile computing device may be implemented as a dual-mode Global System for Mobile Communications/Universal Mobile Telephone System (GSM/UMTS) quad-band device. The mobile computing device also may comprise a Global Positioning System (GPS) antenna for providing positioning determination capabilities and location-based services. In various implementations, the audio receiver may be ported to an in-vehicle system, such as an onboard entertainment system, navigation system, and/or communications system.

Figure 1A:
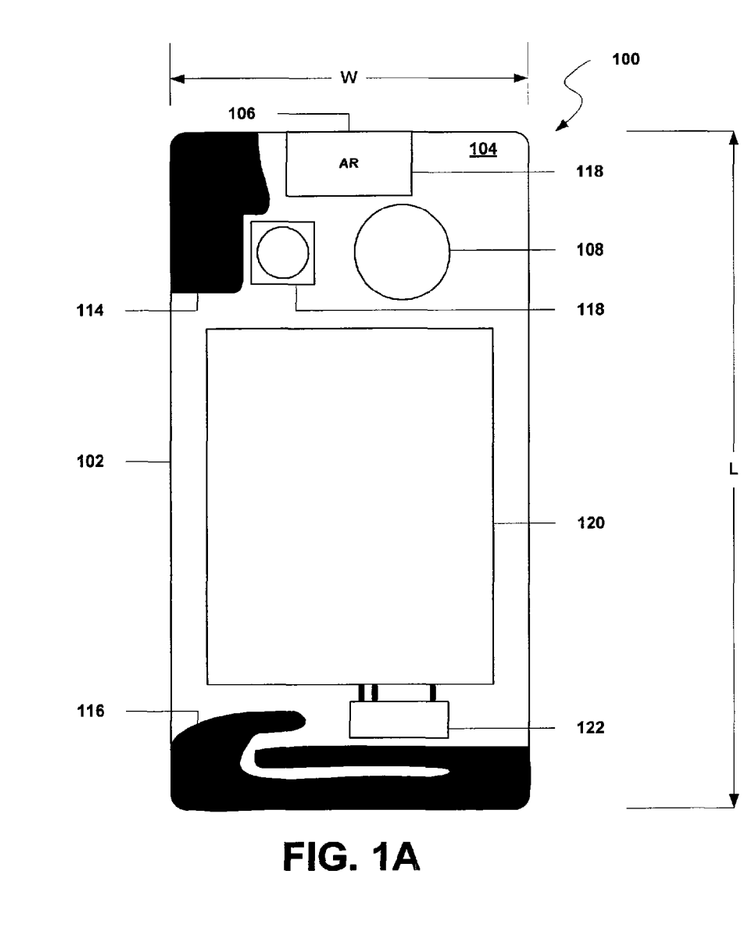
FIGS. 1A-C illustrate a mobile computing device in accordance with one or more embodiments.
Figure 1B:
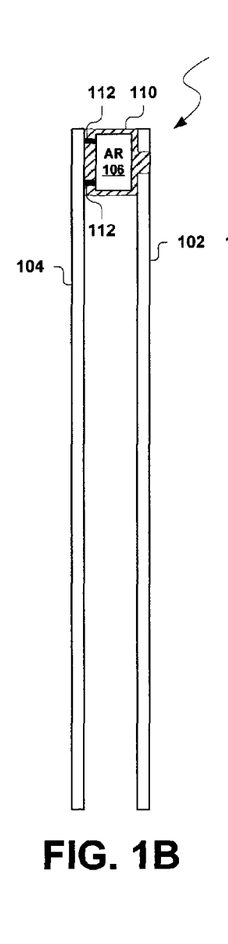
Figure 1C:
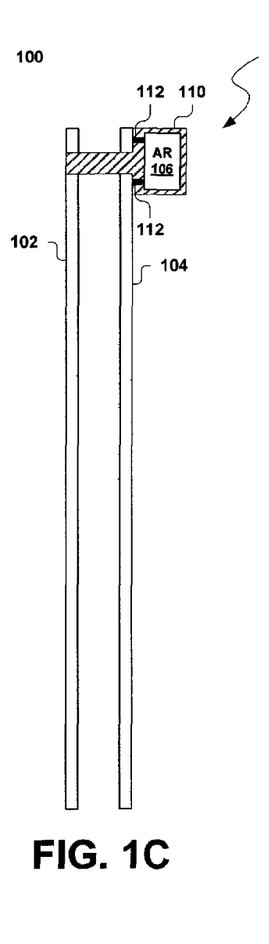

FIGS. 1A-C illustrate a mobile computing device 100 in accordance with one or more embodiments. The mobile computing device 100 may be implemented, for example, by a combination handheld computer and mobile telephone, sometimes referred to as a smart phone. Examples of smart phones include, for example, Palm® products such as Palm® Treo™ smart phones.

Although some embodiments may be described with the mobile computing device 100 implemented as a smart phone by way of example, it may be appreciated that the embodiments are not limited in this context. For example, the mobile computing device 100 may comprise, or be implemented as, any type of suitable wireless device that is consistent with the described embodiments, such as a mobile station, portable computing device with a self-contained power source (e.g., battery), personal digital assistant (PDA), cellular telephone, combination cellular telephone/PDA, mobile unit, portable computer, handheld computer, palmtop computer, wearable computer, media player, pager, messaging device, data communications device, and so forth.

The mobile computing device 100 may provide voice communications functionality in accordance with different types of cellular systems. Examples of cellular systems may include GSM systems, Code Division Multiple Access (CDMA) systems, North American Digital Cellular (NADC) systems, Time Division Multiple Access (TDMA) systems, Extended-TDMA (E-TDMA) systems, Narrowband Advanced Mobile Phone Service (NAMPS) systems, third generation (3G) systems such as UMTS, Wide-band CDMA (WCDMA), CDMA-2000 and so forth.

In addition to voice communications functionality, the mobile computing device 100 may be arranged to provide wireless wide area network (WWAN) data communications functionality in accordance with different types of cellular systems. Examples of cellular systems offering WWAN data communications services may include Evolution Data Optimized (EVDO) systems, Evolution For Data and Voice (EVDV) systems, CDMA/1xRTT systems, GSM with General Packet Radio Service (GPRS) (GSM/GPRS) systems, Enhanced Data Rates for Global Evolution (EDGE) systems, High Speed Downlink Packet Access (HSDPA) systems, High Speed Uplink Packet Access (HSUPA) systems, and so forth.

The mobile computing device 100 may be arranged to provide data communications functionality in accordance with different types of wireless local area network (WLAN) systems. Examples of suitable WLAN systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and so forth.

The mobile computing device 100 may be arranged to perform data communications in accordance with different types of shorter range wireless systems, such as a wireless personal area network (PAN) system. One example of a suitable wireless PAN system offering data communication services may include a Bluetooth system operating in accordance with the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Other examples may include systems using infrared techniques or near-field communication techniques and protocols, such as electro-magnetic induction (EMI) techniques. An example of EMI techniques may include passive or active radio-frequency identification (RFID) protocols and devices.

As shown in FIG. 1A, the mobile computing device 100 may comprise an external housing 102 and a PCB 104. The housing 102 may comprise various materials such as plastic, metal, ceramic, glass, and so forth, suitable for enclosing and protecting the internal components of the mobile computing device 100. The PCB 104 may comprise materials such as FR4, Rogers R04003, and/or Roger RT/Duroid, for example, and may include one or more conductive traces, via structures, and/or laminates. The PCB 104 also may include a finish such as Gold, Nickel, Tin, or Lead. In various implementations, the PCB 104 may be fabricated using processes such as etching, bonding, drilling, and plating.

The mobile computing device 100 may comprise a low-profile, small and compact device design. For example, the size of the mobile computing device 100 may be approximately 103.0 mm Length (L)×53.0 mm Width (W)×14.7 mm Thickness (T) or smaller. It can be appreciated that designing devices with such small form factors present major difficulties with respect to antenna and component layout.

The mobile computing device 100 may comprise an audio receiver 106. As shown, the audio receiver 106 may be located substantially near the top of the mobile computing device 100 in close proximity to a speaker 108. The audio receiver 106 may comprise audio components such as, for example, a digital audio processor for converting and/or modulating received audio data, a digital amplifier for amplifying audio data from the digital audio processor, and one or more filters for filtering output from the digital amplifier to provide an audio signal capable of reproduction by the speaker 108. In various implementations, the audio receiver 106 may be ported to an in-vehicle system such an onboard entertainment system, navigation system, and/or communications system. The embodiments, however, are not limited in this context.

In one or more embodiments, the audio receiver 106 may be structured and arranged to port to the rear of the mobile computing device 100. For example, the audio receiver 106 may port or connect to the side of the PCB 104 facing the back of the mobile computing device 100. As shown in FIG. 1B, for example, the audio receiver 106 may be arranged to port to the PCB 104 and include a cut-out through a portion of the housing 102 at the top and back of the mobile computing device 100. As shown in FIG. 1C, for example, the audio receiver 106 may be arranged to port to the PCB 104 and include a cut-out through the PCB 104 and a portion of the housing 102 at the top and front of the mobile computing device 100. The audio receiver 106 may be positioned between a rear portion of the housing 102 and the PCB 104. By placing and porting the audio receiver 106 to the back, the size (e.g., thickness) of the mobile computing device 100 may be reduced resulting in a more compact, sleeker, and/or aesthetic device. In various implementations, the audio receiver 106 may be encapsulated in a protective rubber boot 110 and may connect to the PCB 104 through one or more spring contacts 112. It can be appreciated that other structural arrangements are possible consistent with the described embodiments.

In some embodiments, the mobile computing device 100 may be implemented as a dual-mode device supporting communication over both a GSM network and a UMTS network. In general, four frequency bands are used for GSM communication: the 850 MHz frequency band, the 900 MHz frequency band, the 1800 MHz frequency band, and the 1900 MHz frequency band, as defined by the European Telecommunications Standards Institute (ETSI). The 2100 MHz frequency band may be used for UMTS communication.

The mobile computing device 100 (e.g., dual-mode GSM/UMTS device) may be implemented as a multi-band device supporting multiple frequency bands. In some embodiments, for example, the mobile computing device 100 may be implemented as a quad-band 850/1800/1900/2100 MHz device configured to operate in the 850 MHz frequency band, the 1800 MHz frequency band, the 1900 MHz frequency band, and the 2100 MHz frequency band. In some embodiments, the mobile computing device 100 may be implemented as a quad-band 900/1800/1900/2100 MHz device configured to operate in the 900 MHz frequency band, the 1800 MHz frequency band, the 1900 MHz frequency band, and the 2100 MHz frequency band.

As shown in FIG. 1A, the mobile computing device 100 may have an internal antenna architecture comprising a first internal antenna element 114 and a second internal antenna element 116 disposed on the PCB 104 in a fixed position internal to the housing 102. The first internal antenna element 114 may be located substantially near the top of the mobile computing device 100. For example, the first internal antenna element 114 may be located substantially near the top of the housing 102 and/or the top of the PCB 104. The second internal antenna element 116 may be located substantially near the bottom of the mobile computing device 100. For example, the second internal antenna element 116 may be located substantially near the bottom of the housing 102 and/or the bottom of the PCB 104.

In one or more embodiments, the mobile computing device 100 may comprise an internal quad-band antenna architecture having a split tri-band/single-band design. For example, the first internal antenna element 114 may be configured for single-band UMTS operation in the 2100 MHz frequency band. The second internal antenna element 116 may be configured for tri-band GSM operation in the 850 MHz frequency band, the 1800 MHz frequency band, and the 1900 MHz frequency band (850/1800/1900 MHz) or in the 900 MHz frequency band, the 1800 MHz frequency band, and the 1900 MHz frequency band (900/1800/1900 MHz). In such embodiments, the first internal antenna element 114 and the second internal antenna element 116 may coexist to cover all four frequency bands with sufficient efficiency and specific absorption rate (SAR) performance. The embodiments, however, are not limited in this context.

The first internal antenna element 114 (e.g., single-band element) may be positioned substantially near the top of the housing 102 and/or the top of the PCB 104. The first internal antenna element 114 may be configured to operate in the highest frequency band, such as the 2100 MHz frequency band, and may require the smallest antenna volume. In some embodiments, the first internal antenna element 114 may be structured and arranged in close proximity to the audio receiver 106, the speaker 108, a camera 118, and/or a battery 120 within the mobile computing device 100. Due to the small volume required by the first internal antenna element 114 (e.g., single-band element), there is sufficient space on the top of the mobile computing device 100 to implement the audio receiver 106 as well as a high-quality speaker 108, a camera 118, and/or other components.

In various implementations, the first internal antenna element 114 may employ a PIFA type design having a ground layer of the PCB 104 underneath the internal antenna element 114. The ground plane may improve antenna performance and reduce SAR. The ground plane also may be required underneath the first internal antenna element 114 when certain components positioned at the edge of the PCB 104 demand a ground layer underneath for their circuitry. In such implementations, the first internal antenna element 114 may achieve greater than 50% efficiency with a SAR value lower than the FCC limit of 1.6 mW/g.

The second internal antenna element 116 (e.g., tri-band antenna element) may be positioned substantially near the bottom of the housing 102 and/or the bottom of the PCB 104 in order to improve efficiency. In some embodiments, the second internal antenna element 116 may be structured and arranged in close proximity to various components of the mobile computing device 100 such as a battery 120 and/or battery connector 122 within the mobile computing device 100.

In various implementations, the second internal antenna element 116 may be structured and arranged with a bent or folded configuration. For example, the second internal antenna element 116 may employ a paper-clip type design in which most of ground layer of the PCB 104 underneath the internal antenna element 116 is removed. In such implementations, the antenna pattern may be optimized and most of the radiating element at the lower frequency bands may be on the top of the antenna carrier and further away from the PCB 104. As such, the internal antenna element 116 may achieve 50% minimum efficiency at the 850/1800/1900 or 900/1800/1900 MHz frequency bands with a reduced SAR value of 1.35 mW/g, which is lower than FCC limit of 1.6 mW/g.

The first internal antenna element 114 (e.g., single-band element) may be positioned at the top of the mobile computing device 100 and the second internal antenna element 116 (e.g., tri-band antenna element) may be positioned at the bottom of the mobile computing device 100 to allow enough spatial separation to provide sufficient isolation among all four (e.g., 850/1800/1900/2100 or 900/1800/1900/2100 MHz) frequency bands. In some embodiments, the first internal antenna element 114 and the second internal antenna element 116 may achieve maximum separation within the mobile computing device 100. For example, the first internal antenna element 114 may be integrated with the mobile computing device 100 such that an external surface of the first internal antenna element 114 is substantially even, aligned or flush with the top of the housing 102 and/or the top of the PCB 104. The second internal antenna element 116 may be integrated with the mobile computing device 100 such that an external surface of the second internal antenna element 116 is substantially even, aligned or flush with the bottom of the housing 102 and/or the bottom of the PCB 104.

The internal antenna architecture may allow the audio receiver 106 to port to the rear of the mobile computing device 100 while implementing a quad-band antenna solution for a mobile computing device 100 having a small form factor. The internal antenna architecture also may allow devices (e.g., QWERTY keyboard products) to have smaller internal dimensions and smaller antenna area while maintaining excellent GSM and UMTS services and functionality, such as high quality audio and camera functionality in the back of the device.

While the mobile computing device 100 shown in FIG. 1A comprises an exemplary embodiment, it can be appreciated that other design layouts may be implemented consistent with the described embodiments. For example, the exact placement or location of the first internal antenna element 114 and the second internal antenna element 116 within the mobile computing device 100 may be performed in accordance with various performance and design constraints. For example, the efficiency of each antenna may depend upon a proper relationship between the size and shape of the antenna and the wavelength of the targeted frequency. The specific frequency range that the antenna is designed to cover may dictate the optimal size of an antenna. Therefore, the specific implementation of the first internal antenna element 114 and the second internal antenna element 116 may vary depending upon such factors as the target operating frequencies, power consumption requirements, battery life, a form factor of the mobile computing device, transceiver operations, signal quality, weight considerations of the mobile computing device, and so forth.

The first internal antenna element 114 and the second internal antenna element 116 may be arranged to transmit and/or receive electrical energy according to a given set of performance or design constraints. During transmission, an antenna may accept energy from a transmission line and radiate radio frequency (RF) energy into space via a wireless shared media. During reception, an antenna may gather RF energy from an incident wave received over wireless shared media, and provide RF energy to a corresponding transmission line. The power radiated from or received by an antenna typically is described in terms of gain. An antenna may operate according to a desired Voltage Standing Wave Ratio (VSWR) value that relates the impedance match of an antenna feed point with a feed line or transmission line of a communications device. To radiate (RF) energy with minimum loss, or to pass received RF energy to a wireless receiver with minimum loss, the impedance of an antenna may be matched to the impedance of a transmission line or feed point of the PCB 104.

The first internal antenna element 114 and the second internal antenna element 116 may be tuned for operating at one or more frequency bands. Accordingly, the mobile computing device 100 may be compatible with multiple types of wireless data, multimedia, and/or cellular systems. In addition, the first internal antenna element 114 and/or the second internal antenna element 116 may be used to implement various spatial diversity techniques to improve communication of wireless signals across one or more frequency bands of wireless shared media.

While particular examples may be described for purposes of illustration, it can be appreciated that the first internal antenna element 114 and/or the second internal antenna element 116 may be implemented using any suitable type of internal antenna which is consistent with the described embodiments. Examples of such internal antennas include a PIFA antenna, a paper-clip antenna, a planar inverted-L antenna, an inverted-F antenna with a helical structure, an inverted-L antenna with a helical structure, a monopole antenna, a meandered monopole antenna, a dipole antenna, a balanced antenna, a printed helical antenna, a chip antenna, a ceramic antenna, and so forth.

In various embodiments, the first internal antenna element 114 and/or the second internal antenna element 116 may comprise multiple layers and/or traces formed by chemical etching, metal etching, and other similar techniques. The actual number of layers, and length of each individual layer, may vary for a particular implementation. The antenna traces may have any suitable pattern or geometry tuned for various operating frequencies. For example, the antenna traces may comprise one or more center lines and/or branch lines. Phase lines and/or various chip components, such as resistors, capacitors or inductors, may be used among the center lines and/or branch lines. The different elements may be contacted or parasitic.

In various embodiments, the first internal antenna element 114 and/or the second internal antenna element 116 may comprise a flexible material or substrate. A flexible material may include any pliant material that is capable of being bent or flexed such as a flexible printed circuit (FPC). Other flexible materials may be used, however, such as a wire material, helical material, Teflon material, FR4 material, Mylar material, dielectric substrate, a soft plastic material, and other flexible materials.

In some embodiments, the first internal antenna element 114 and/or the second internal antenna element 116 may comprise a rigid material. A rigid material may include any material that is deficient in or devoid of flexibility. Examples of rigid materials may include metal materials, plastic materials, ceramic materials, and so forth. In some cases, an antenna may be formed using a flat stamped metal having suitable characteristics to match the design and performance constraints for the mobile computing device 100.

Figure 2:
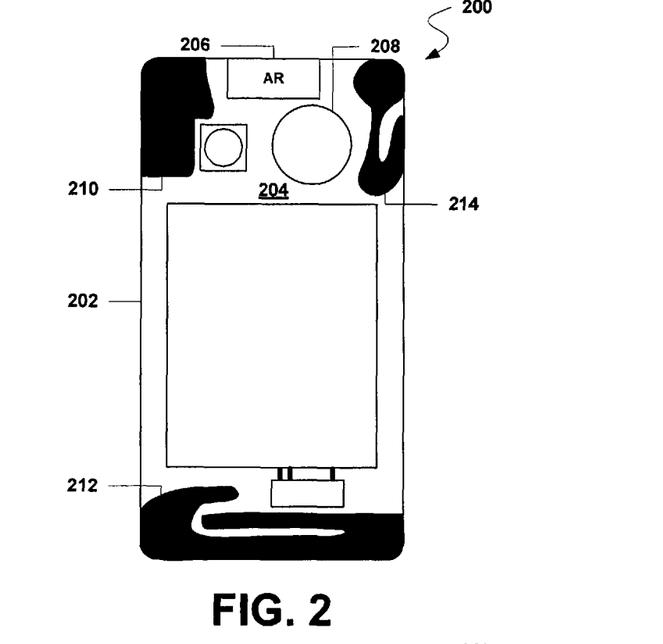
FIG. 2 illustrates a mobile computing device in accordance with one or more embodiments.

FIG. 2 illustrates a mobile computing device 200 in accordance with one or more embodiments. In general, various structural and operational aspects of the mobile computing device 200 may be implemented as described above. For example, in one or more embodiments, the mobile computing device 200 may comprise an audio receiver 206 and speaker 208 implemented as described above. The mobile computing device 200 also may comprise an internal quad-band antenna architecture having a split tri-band/single-band design including a first internal antenna element 210 (e.g., single-band 2100 MHz antenna element) positioned on a PCB 204 at the top of the mobile computing device 200 and a second internal antenna element 212 (e.g., tri-band 850/1800/1900 MHz or 900/1800/1900 MHz antenna element) positioned on the PCB 204 at the bottom of the mobile computing device 200.

As shown, the mobile computing device 200 may comprise an additional or third internal antenna element 214 disposed on the PCB 204. In one or more embodiments, the third internal antenna element 214 may comprise a single-band antenna element such as a separate Global Positioning System (GPS) antenna element. In such embodiments, the third internal antenna element 214 may be configured to operate in the 1575 MHz frequency band for GPS services. Accordingly, the mobile computing device 200 may be arranged to provide various position determining capabilities and/or location-based services (LBS). Examples of such services include, without limitation, wireless 911 emergency services, roadside assistance, asset tracking, fleet management, friends and family locator services, dating services, and navigation services which may provide the user with maps, directions, routing, traffic updates, mass transit schedules, information regarding local points-of-interest (POI) such as restaurants, hotels, landmarks, and entertainment venues, and other types of services based on the current location of the mobile computing device 200.

In some embodiments, the third internal antenna element 214 may be structured and arranged in close proximity to the audio receiver 206 and various components (e.g., speaker, camera, battery) within the mobile computing device 200. Due to the small volume required by the first internal antenna element 210 (e.g., single-band element), there is sufficient space on the top of the mobile computing device 200 to implement the audio receiver 206 as well as the third internal antenna element 214 (e.g., GPS antenna element).

Figure 3:
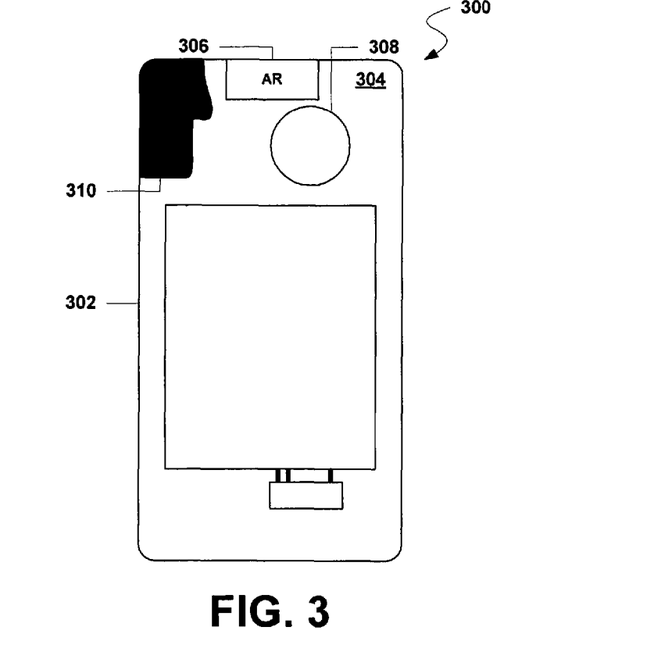
FIG. 3 illustrates a mobile computing device in accordance with one or more embodiments.

FIG. 3 illustrates a mobile computing device 300 in accordance with one or more embodiments. In various embodiments, the mobile computing device 300 may be similar in some structural and operational aspects to the mobile computing devices 100, 200. For example, the mobile computing device 300 may comprise an audio receiver 306 and speaker 308 implemented as described. In general, however, the mobile computing device 300 may implement less functionality than the mobile computing devices 100, 200 described above.

In one or more embodiments, the mobile computing device 300 may comprise an internal antenna architecture having a single internal antenna element 310 positioned on a PCB 304 at the top of the mobile computing device 300. In various implementations, the internal antenna element 310 may comprise a single-band antenna. In such implementations, the internal antenna element 310 may allow the mobile computing device 300 to operate in a single frequency band such as in the 850 MHz frequency band, the 900 MHz frequency band, the 1800 MHz frequency band, or the 1900 MHz frequency band. It can be appreciated that other frequency bands may be implemented consistent with the described embodiments.

As shown in FIG. 3A, the internal antenna element 310 (e.g., single-band antenna element) may be structured and arranged in close proximity to the audio receiver 306. Due to the small volume required by the internal antenna element 310 (e.g., single-band element), there is sufficient space on the top of the mobile computing device 300 to implement the audio receiver 306 and the speaker 308.

While the mobile computing device 300 shown in FIG. 3 comprises an exemplary embodiment, it can be appreciated that other design layouts may be implemented consistent with the described embodiments. For example, the exact placement or location of the internal antenna element 310 within the mobile computing device 300 may be performed in accordance with various performance and design constraints. It also can be appreciated that internal antenna element 310 may be positioned elsewhere within the mobile computing device 300 (e.g., side or bottom) and, in some embodiments, may comprise a multi-band (e.g., dual-band, tri-band) antenna.

Figure 4:
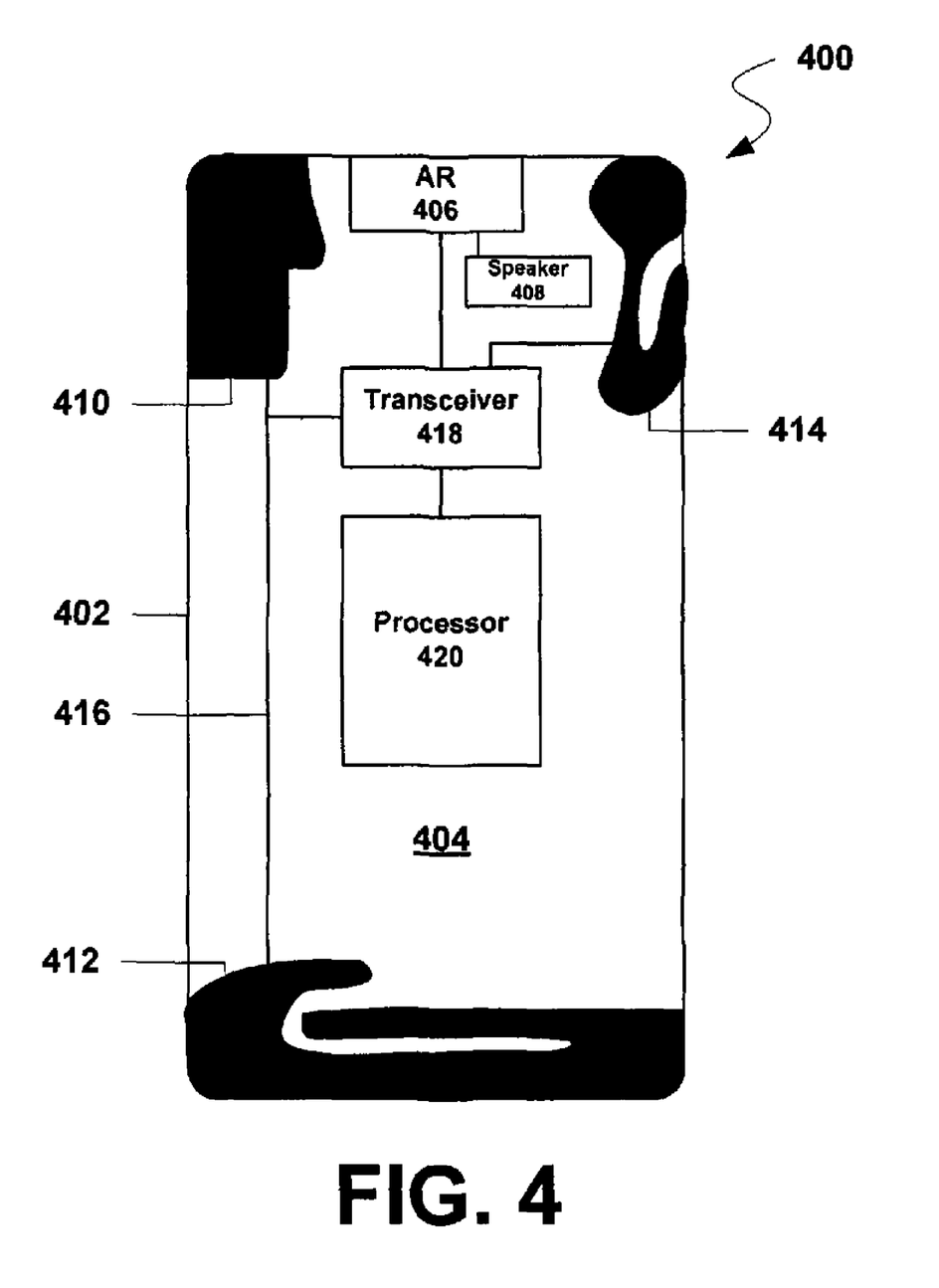
FIG. 4 illustrates a mobile computing device in accordance with one or more embodiments.

FIG. 4 illustrates a mobile computing device 400 in accordance with one or more embodiments. In general, various structural and operational aspects of the mobile computing device 400 may be implemented as described above. For example, in one or more embodiments, the mobile computing device 400 may comprise an audio receiver 406 coupled to a speaker 408 and implemented as described above.

The mobile computing device 400 may comprise an internal quad-band antenna architecture having a split tri-band/single-band design including a first internal antenna element 410 (e.g., single-band 2100 MHz antenna element) positioned on the PCB 404 at the top of the mobile computing device 400 and a second internal antenna element 412 (e.g., tri-band 850/1800/1900 MHz or 900/1800/1900 MHz antenna element) positioned on the PCB 404 at the bottom of the mobile computing device 400. The mobile computing device 400 also may comprise a third internal antenna element 414 implemented, for example, as a GPS antenna.

The first internal antenna element 410 (e.g., dual-band antenna element) and the second internal antenna element 412 (e.g., tri-band antenna element) may be coupled to each other by an RF connector 416. In one or more embodiments, the RF connector 416 may comprise a dual-mode RF connector supporting communication by the mobile computing device 400 over both a GSM network and a UMTS network.

In various embodiments, first internal antenna element 412 and the second internal antenna element 412 may be electrically connected through the RF connector 416 to a transceiver module 418 operatively associated with a processor module 420. In order to increase power transfer, the transceiver module 418 may be interconnected to an antenna such that respective impedances are substantially matched or electrically tuned to compensate for undesired antenna impedance. In some cases, the transceiver module 418 may be implemented as part of a chip set associated with the processor module 420.

In various embodiments, the transceiver module 418 may comprise one or more transceivers or components arranged to communicate using different types of protocols, communication ranges, operating power requirements, RF sub-bands, information types (e.g., voice or data), use scenarios, applications, and so forth. The transceiver module 418 generally may be implemented using one or more chips as desired for a given implementation. Although the transceiver module 418 may be shown as being separate from and external to the processor module 420 for purposes of illustration, it is worthy to note that in various embodiments some portion or the entire transceiver module 418 may be included on the same integrated circuit as the processor module 420.

The transceiver module 418 may comprise, for example, one or more cellular transceivers or components arranged to support communication over a cellular voice channel for a system such as a CDMA, GSM, and/or UMTS cellular system. The transceiver module 418 also may comprise one or more WWAN transceivers or components arranged to support data communication over a WWAN data channel in accordance with one or more WWAN protocols such as EVDO protocols, EVDV protocols, CDMA/1xRTT protocols, GSM/GPRS protocols, EDGE protocols, HSDPA protocols, and so forth. The transceiver module 418 also may comprise one or more transceivers or components arranged to support data communication over a WLAN data channel in accordance with one or more WLAN protocols such as IEEE 802.11a/b/g/n protocols, IEEE 802.16 protocols, IEEE 802.20 protocols, PAN protocols, Infrared protocols, Bluetooth protocols, EMI protocols including passive or active RFID protocols, and so forth. The transceiver module 418 may comprise a GPS transceiver coupled to the third antenna element 414 (e.g., GPS antenna) to support position determination capabilities and/or location-based services.

In various embodiments, the processor module 420 may comprise one or more processors such as a host processor and/or a radio processor. In such embodiments, the host processor may be arranged to provide processing or computing resources for the mobile computing device 400. The radio processor may be responsible for performing various voice and data communications operations for the mobile computing device 400 such as transmitting and receiving voice and data information over one or more wireless communications channels. The host processor and the radio processor may communicate with each other using interfaces such as one or more universal serial bus (USB) interfaces, micro-USB interfaces, universal asynchronous receiver-transmitter (UART) interfaces, general purpose input/output (GPIO) interfaces, control/status lines, control/data lines, audio lines, and so forth. Although some embodiments may comprise a dual-processor architecture, it is worthy to note that the mobile computing device 400 may comprise any suitable processor architecture and/or any suitable number of processors consistent with the described embodiments.

The host processor may be implemented as a host central processing unit (CPU) using any suitable processor or logic device, such as a as a general purpose processor. Although some embodiments may be described with the host processor implemented as a CPU or general purpose processor by way of example, it may be appreciated that the embodiments are not limited in this context. For example, the host processor may comprise, or be implemented as, a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

The host processor may be responsible for executing various software programs such as system programs and application programs to provide computing and processing operations for the mobile computing device 400. System programs generally may assist in the running of the mobile computing device 400 and may be directly responsible for controlling, integrating, and managing the individual hardware components of the computer system. Examples of system programs may include, without limitation, an operating system (OS), device drivers, programming tools, utility programs, software libraries, application programming interfaces (APIs), and so forth. The mobile computing device 400 may utilize any suitable OS in accordance with the described embodiments such as a Palm OS®, Palm OS® Cobalt, Microsoft® Windows OS, Microsoft Windows® CE, Microsoft Pocket PC, Microsoft Mobile, Symbian OS™, Embedix OS, Linux, Binary Run-time Environment for Wireless (BREW) OS, JavaOS, a Wireless Application Protocol (WAP) OS, and so forth.

Application programs generally may allow a user to accomplish one or more specific tasks. In various implementations, the application programs may provide one or more graphical user interfaces (GUIs) to communicate information between the mobile computing device 400 and a user. Examples of application programs may include, without limitation, one or more messaging applications (e.g., telephone, voicemail, facsimile, e-mail, IM, SMS, MMS, video conferencing), web browser applications, personal information management (PIM) applications (e.g., contacts, calendar, scheduling, tasks), GPS applications, LBS applications, word processing applications, spreadsheet applications, database applications, media applications (e.g., video player, audio player, multimedia player, digital camera, video camera, media management), gaming applications, and so forth.

As mentioned above, the radio processor may perform voice and/or data communication operations for the mobile computing device 400. For example, the radio processor may be arranged to communicate voice information and/or data information over one or more assigned frequency bands of a wireless communication channel. In various embodiments, the radio processor may be implemented as a communications processor using any suitable processor or logic device, such as a modem processor or baseband processor. In such embodiments, the radio processor may perform analog and/or digital baseband operations for the mobile computing device 400. For example, the radio processor may perform digital-to-analog conversion (DAC), analog-to-digital conversion (ADC), modulation, demodulation, encoding, decoding, encryption, decryption, and so forth. Although the radio processor may be implemented as a modem processor or baseband processor by way of example, the embodiments are not limited in this context. For example, the radio processor may comprise, or be implemented as, a digital signal processor (DSP), media access control (MAC) processor, or any other type of communications processor in accordance with the described embodiments.

Various embodiments are directed to audio receiver design that may potentially improve the performance of a mobile computing device by improving one or more of characteristics, such as a size, shape, form factor, power consumption, battery life, transceiver operations, signal quality, weight, and other characteristics of the mobile computing device. For example, various embodiments may provide improved performance while complying with regulatory requirements (e.g., SAR limit) for device operation. In various implementations, the described embodiments may provide flexibility for low-profile, small and compact device designs. Accordingly, a user may realize enhanced products and services.

Numerous specific details have been set forth to provide a thorough understanding of the embodiments. It will be understood, however, that the embodiments may be practiced without these specific details. In other instances, well-known operations, components and circuits have not been described in detail so as not to obscure the embodiments. It can be appreciated that the specific structural and functional details are representative and do not necessarily limit the scope of the embodiments.

Various embodiments may comprise one or more elements. An element may comprise any structure arranged to perform certain operations. Each element may be implemented as hardware, software, or any combination thereof, as desired for a given set of design and/or performance constraints. Although an embodiment may be described with a limited number of elements in a certain topology by way of example, the embodiment may include more or less elements in alternate topologies as desired for a given implementation.

It is worthy to note that any reference to "one embodiment" or "an embodiment" means that a particular feature, structure, or characteristic described in connection with the embodiment is included in at least one embodiment. The appearances of the phrase "in one embodiment" in the specification are not necessarily all referring to the same embodiment.

Although some embodiments may be illustrated and described as comprising exemplary functional components or modules performing various operations, it can be appreciated that such components or modules may be implemented by one or more hardware components, software components, and/or combination thereof. The functional components and/or modules may be implemented, for example, by logic (e.g., instructions, data, and/or code) to be executed by a logic device (e.g., processor). Such logic may be stored internally or externally to a logic device on one or more types of computer-readable storage media.

It also is to be appreciated that the described embodiments illustrate exemplary implementations, and that the functional components and/or modules may be implemented in various other ways which are consistent with the described embodiments. Furthermore, the operations performed by such components or modules may be combined and/or separated for a given implementation and may be performed by a greater number or fewer number of components or modules.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within registers and/or memories into other data similarly represented as physical quantities within the memories, registers or other such information storage, transmission or display devices.

It is worthy to note that some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. With respect to software elements, for example, the term "coupled" may refer to interfaces, message interfaces, API, exchanging messages, and so forth.

While certain features of the embodiments have been illustrated as described above, many modifications, substitutions, changes and equivalents will now occur to those skilled in the art. It is therefore to be understood that the appended claims are intended to cover all such modifications and changes as fall within the true spirit of the embodiments.

The invention claimed is:

1. A mobile computing device, comprising:
a housing enclosing a printed circuit board, the housing including a front portion and a rear portion;
an audio receiver positioned substantially at a top of the housing, the audio receiver ported to a side of the printed circuit board facing the rear portion of the housing, the audio receiver ported to the rear portion of the housing, the audio receiver encapsulated in an elastomeric boot, the elastomeric boot connecting the housing to the printed circuit board; and
a speaker adjacent to the audio receiver;
wherein the audio receiver is configured to receive audio data and provide an audio signal for reproduction by the speaker.

2. The mobile computing device of claim 1, a portion of the elastomeric boot received in a cut-out in the housing.

3. The mobile computing device of claim 1, the audio receiver connected to the printed circuit board through one or more spring contacts.

4. The mobile computing device of claim 1, the audio receiver to port to an in-vehicle system.

5. The mobile computing device of claim 4, the in-vehicle system comprising at least one of an onboard entertainment system, navigation system, and communications system.

6. The mobile computing device of claim 1, the audio receiver in close proximity to a first internal antenna element positioned substantially near a top of the housing, the first internal antenna element configured to operate in at least one frequency band for communication in a first mode.

7. The mobile computing device of claim 6, the first mode comprising a Universal Mobile Telephone System (UMTS) mode.

8. The mobile computing device of claim 7, the at least one frequency band comprising the 2100 MHz frequency band.

9. The mobile computing device of claim 6, the first mode comprising at least one of a Code Division Multiple Access (CDMA) mode and a Global System for Mobile Communications (GSM) mode.

10. The mobile computing device of claim 6, the first mode comprising a Global Positioning System (GPS) mode.

11. The mobile computing device of claim 6, comprising a second internal antenna element on the printed circuit board configured to operate in multiple frequency bands for operation in a second mode.

12. The mobile computing device of claim 11, the second mode comprising a Global System for Mobile Communications (GSM) mode.

13. The mobile computing device of claim 12, the multiple frequency bands comprising the 850 MHz frequency band, the 1800 MHz frequency band, and the 1900 MHz frequency band.

14. The mobile computing device of claim 12, the multiple frequency bands comprising the 900 MHz frequency band, the 1800 MHz frequency band, and the 1900 MHz frequency band.

15. The mobile computing device of claim 11, the second internal antenna element positioned substantially near a bottom of the housing or a bottom of the printed circuit board.

16. A mobile computing device, comprising:
a first internal antenna element on a printed circuit board configured to operate in a Universal Mobile Telephone System (UMTS) mode;
a second internal antenna element on the printed circuit board configured to operate in a Global System for Mobile Communications (GSM) mode; and an audio receiver positioned substantially at a top of a housing of the mobile computing device, the housing including a front portion and a rear portion, the audio receiver ported to a side of the printed circuit board facing the rear portion of the housing, the audio receiver ported to the rear portion of the housing, the audio receiver encapsulated in an elastomeric boot, the elastomeric boot connecting the housing to the printed circuit board;

wherein the first internal antenna element and the second internal antenna element are positioned at opposite ends of the housing.

17. The mobile computing device of claim 16, a portion of the elastomeric boot received in a cut-out in the housing.

18. The mobile computing device of claim 16, the audio receiver connected to the printed circuit board through one or more spring contacts.

19. The mobile computing device of claim 16, the audio receiver to port to an in-vehicle system.

20. The mobile computing device of claim 19, the in-vehicle system comprising at least one of an onboard entertainment system, navigation system, and communications system.

21. The mobile computing device of claim 16, further comprising a third antenna element on the printed circuit board configured to operate in a Global Positioning System (GPS) mode.

22. A mobile computing device, comprising:

an antenna system; and an audio receiver positioned substantially at a top of a housing of the mobile computing device, the housing including a front portion and a rear portion, the audio receiver ported to a side of the printed circuit board facing the rear portion of the housing, the audio receiver ported to the rear portion of the housing, the audio receiver encapsulated in an elastomeric boot, the elastomeric boot connecting the housing to the printed circuit board;

wherein the antenna system comprises first and second antennas, the first antenna positioned at a top end of the mobile computing device adjacent to the audio receiver, and the second antenna positioned at a bottom end of the mobile computing device to allow enough spatial separation of said first and second antennas to provide sufficient isolation therebetween.

\* \* \* \* \*